(12) United States Patent
Kemp (10) Patent No.: US 11,518,424 B2
(45) Date of Patent: Dec. 6, 2022

(54) STAIR-CLIMBING WHEELED CARRIER

(71) Applicant: Gary M. Kemp, San Antonio, TX (US)

(72) Inventor: Gary M. Kemp, San Antonio, TX (US)

( * ) Notice: Subject to any disclaimer, the term of this patent is extended or adjusted under 35 U.S.C. 154(b) by 275 days.

(21) Appl. No.: 16/752,581

(22) Filed: Jan. 24, 2020

(65) Prior Publication Data

US 2021/0229726 A1    Jul. 29, 2021

(51) Int. Cl.
*B62B 5/02* (2006.01)
*B62B 5/00* (2006.01)
*A61G 5/06* (2006.01)
*B62B 9/06* (2006.01)

(52) U.S. Cl.
CPC .............. *B62B 5/026* (2013.01); *A61G 5/061* (2013.01); *B62B 5/0033* (2013.01); *A61G 5/065* (2013.01); *B62B 9/06* (2013.01)

(58) Field of Classification Search
CPC .......... A61G 5/06; A61G 5/061; A61G 5/065; B62B 1/202; B62B 5/026; B62B 5/0033; B62B 5/0046; B62B 7/02; B62B 9/06; B62B 2204/42
See application file for complete search history.

(56) References Cited

U.S. PATENT DOCUMENTS

| | | | | |
|---|---|---|---|---|
| 2,742,973 A | * | 4/1956 | Johannesen | A61G 5/065 180/8.2 |
| 2,931,449 A | | 4/1960 | King | |
| 3,450,219 A | * | 6/1969 | Fleming | B62B 5/026 180/8.2 |
| 3,515,401 A | * | 6/1970 | Gross | B62B 5/02 280/5.26 |
| 4,531,752 A | | 7/1985 | Diener | |
| 4,709,772 A | * | 12/1987 | Brunet | B60L 3/0061 180/8.2 |

(Continued)

FOREIGN PATENT DOCUMENTS

| | | |
|---|---|---|
| CN | 201798859 U | 4/2011 |
| CN | 203234916 U | 10/2013 |

(Continued)

OTHER PUBLICATIONS

HandTrucksrus.com/product-details.aspx?id=1479&cx=bp.

*Primary Examiner* — Jacob B Meyer
*Assistant Examiner* — Maurice L Williams
(74) *Attorney, Agent, or Firm* — Nath, Goldberg & Meyer; Richard C. Litman (57) ABSTRACT

The stair-climbing wheeled carrier has a U-shaped frame defined by a pair of elongated parallel handles and a crossbeam extending between the ends of the handles. Each handle has an axle mount depending therefrom having a star wheel or spider wheel mounted thereon. A dual shaft worm drive motor is mounted on the frame, the shafts driving chain drives connected to the wheels. A throttle extends from one of the handles, and controls leaf springs that operate switches for actuating the reversible motor and returning the throttle to neutral when released. A payload is attached to brackets mounted on the handles. The payload may be a seat for a person needing assistance attending/descending stairs, or a basket for carrying packages or other items upstairs. In use, an assistant uses the handles to support the frame while operating the motor to activate the wheels for climbing stairs.

20 Claims, 8 Drawing Sheets

(56) References Cited

U.S. PATENT DOCUMENTS

| | | | |
|---|---|---|---|
| 4,790,548 A * | 12/1988 | Decelles | A61G 5/065 |
| | | | 280/5.26 |
| 6,484,829 B1 | 11/2002 | Cox | |
| 7,516,503 B1 * | 4/2009 | Larson | A61G 1/0293 |
| | | | 280/47.131 |
| 7,669,862 B2 * | 3/2010 | Kamara | A45C 5/14 |
| | | | 280/5.26 |
| 8,307,473 B1 * | 11/2012 | Lambarth | A61G 5/061 |
| | | | 5/81.1 R |
| 8,393,420 B2 * | 3/2013 | Kim | B62D 55/075 |
| | | | 180/8.2 |
| 8,641,059 B2 * | 2/2014 | Khodor | B62B 3/022 |
| | | | 280/47.28 |
| 8,783,709 B1 * | 7/2014 | Westermann | A61G 5/085 |
| | | | 280/650 |
| 9,527,213 B2 * | 12/2016 | Luo | B25J 9/1694 |
| 9,989,970 B1 * | 6/2018 | Morey | G05D 1/0891 |
| 2005/0087940 A1 * | 4/2005 | Ally | B62B 5/026 |
| | | | 280/5.26 |
| 2006/0113733 A1 * | 6/2006 | Kazaoka | B62B 5/025 |
| | | | 280/5.24 |
| 2006/0145433 A1 * | 7/2006 | Kim | A61G 5/046 |
| | | | 280/5.28 |
| 2009/0309319 A1 * | 12/2009 | Kamara | B62B 5/026 |
| | | | 280/5.26 |
| 2010/0294575 A1 * | 11/2010 | Martel | B62B 1/10 |
| | | | 180/8.2 |
| 2013/0231814 A1 * | 9/2013 | Sarokhan | B62D 57/022 |
| | | | 701/22 |
| 2015/0196439 A1 * | 7/2015 | Osipov | A61G 5/061 |
| | | | 280/5.28 |

FOREIGN PATENT DOCUMENTS

| | | | |
|---|---|---|---|
| CN | 108433895 A | 8/2018 | |
| WO | WO-2009069144 A2 * | 6/2009 | B62D 55/08 |

* cited by examiner

STAIR-CLIMBING WHEELED CARRIER

BACKGROUND

1. Field

The disclosure of the present patent application relates to devices for transporting people or packages over obstacles, and particularly to a stair-climbing wheeled carrier that can be used for assisting a disabled person to ascend stairs, or to provide power-assist for carrying packages up a staircase

2. Description of the Related Art

Advances in modern medicine have resulted in increased life expectancy. One of the problems that affects the elderly is decreased mobility. Various impairments that come with advancing age, such as rheumatoid or degenerative arthritis, may cause joint pain, while other impairments, such as congestive heart failure and pulmonary emphysema, may cause shortness of breath with exertion. Routine daily activities that were never a matter of concern, such as climbing stairs in an apartment building to reach one's living quarters, or even climbing the stairs in one's home to reach the bedroom, become a formidable challenge. Assistance from one's spouse or children offers a partial solution, but still requires some degree of physical exertion, and may entail the risk of injury from a fall. Powered chair lifts installed on a wall adjacent the staircase are another option, but may be too expensive, or may not be feasible for some stairways.

Similar problems may attend the task of carrying packages, such as grocery bags, up a flight of stairs. Anyone who has been tasked with the chore of carrying two or three loads of groceries up flights of stairs to a third floor apartment knows that it can be quite a burden, even for persons in the best of health.

Thus, a stair-climbing wheeled carrier solving the aforementioned problems is desired.

SUMMARY

The stair-climbing wheeled carrier has a U-shaped frame defined by a pair of elongated parallel handles and a crossbeam extending between the ends of the handles. Each handle has an axle mount depending therefrom, each axle mount having a star wheel or spider wheel mounted thereon. A dual shaft worm drive motor is mounted on the frame, the shafts driving chain drives connected to the wheels. A throttle extends from one of the handles, and controls leaf springs that operate switches for actuating the reversible motor and returning the throttle to neutral when released. A payload is attached to brackets mounted on the handles. The payload may be a seat for a person needing assistance ascending/descending stairs, or a basket for carrying packages or other items upstairs. In use, an assistant uses the handles to support the frame while operating the motor to activate the wheels for climbing stairs.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The stair-climbing wheeled carrier has a U-shaped frame defined by a pair of elongated parallel handles and a crossbeam extending between the ends of the handles. Each handle has an axle mount depending therefrom, each axle mount having a star wheel or spider wheel mounted thereon. A dual shaft worm drive motor is mounted on the frame, the shafts driving chain drives connected to the wheels. A throttle extends from one of the handles, and controls leaf springs that operate switches for actuating the reversible motor and returning the throttle to neutral when released. A payload is attached to brackets mounted on the handles. The payload may be a seat for a person needing assistance ascending/descending stairs, or a basket for carrying packages or other items upstairs. In use, an assistant uses the handles to support the frame while operating the motor to activate the wheels for climbing stairs.

Figure 1:
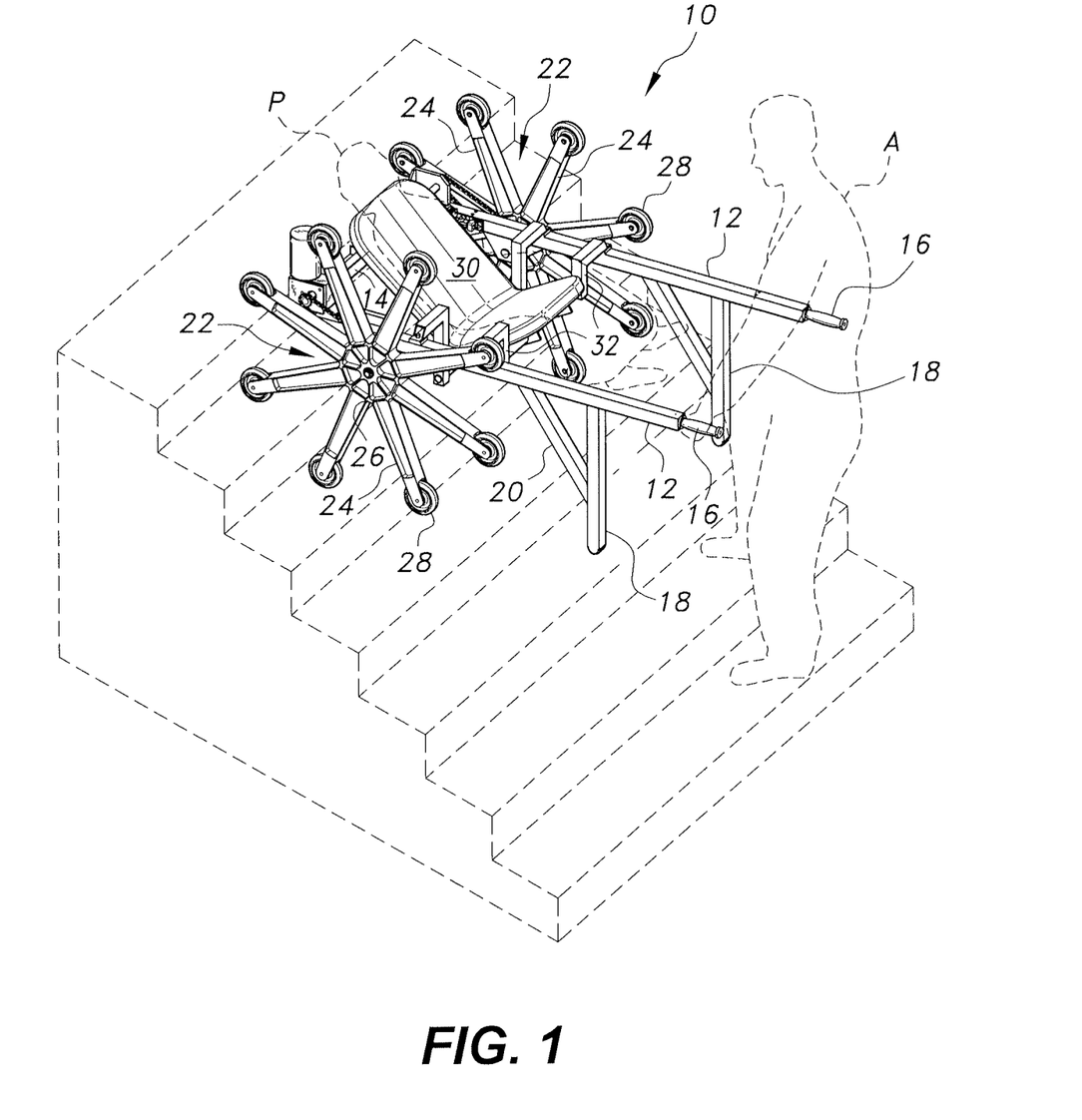
FIG. 1 is an environmental, perspective view of an embodiment of a stair-climbing wheeled carrier having a seat, being used to assist an impaired person going upstairs.
Figure 2:
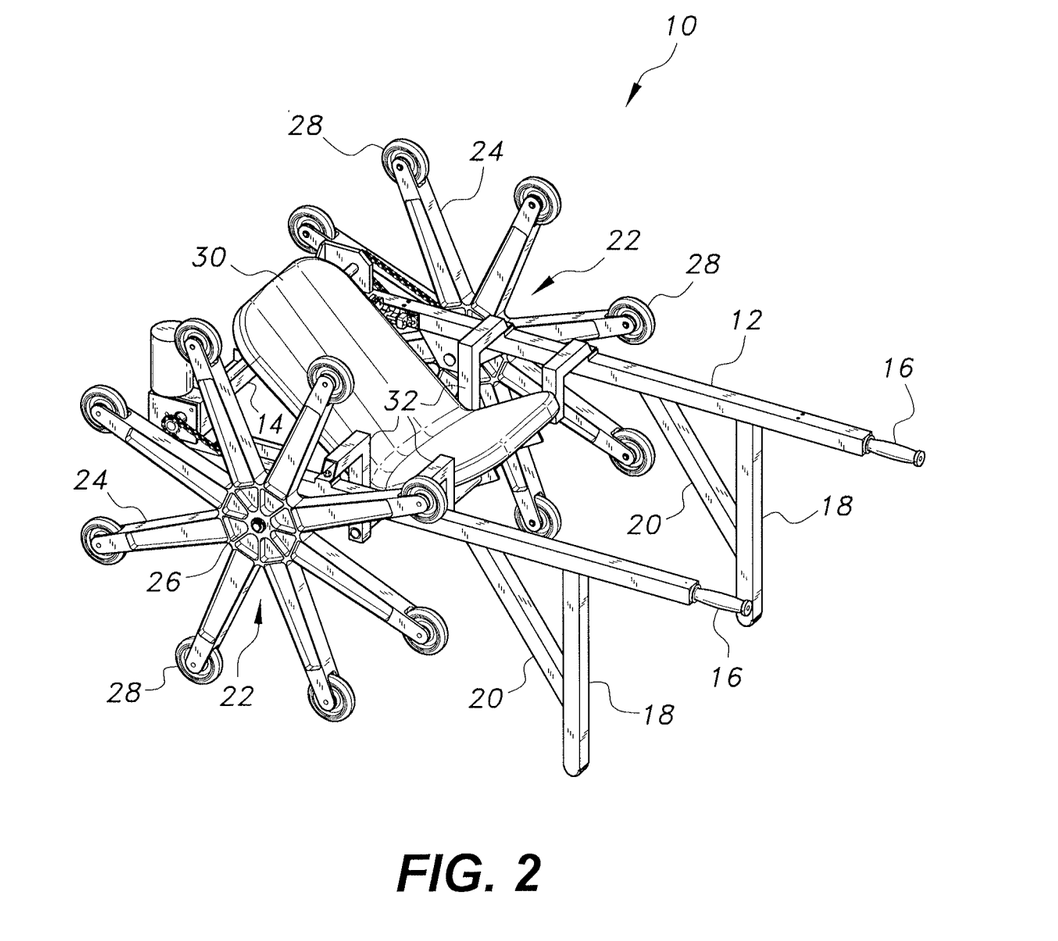
FIG. 2 is a perspective view of the stair-climbing wheeled carrier of FIG. 1.
Figure 3:
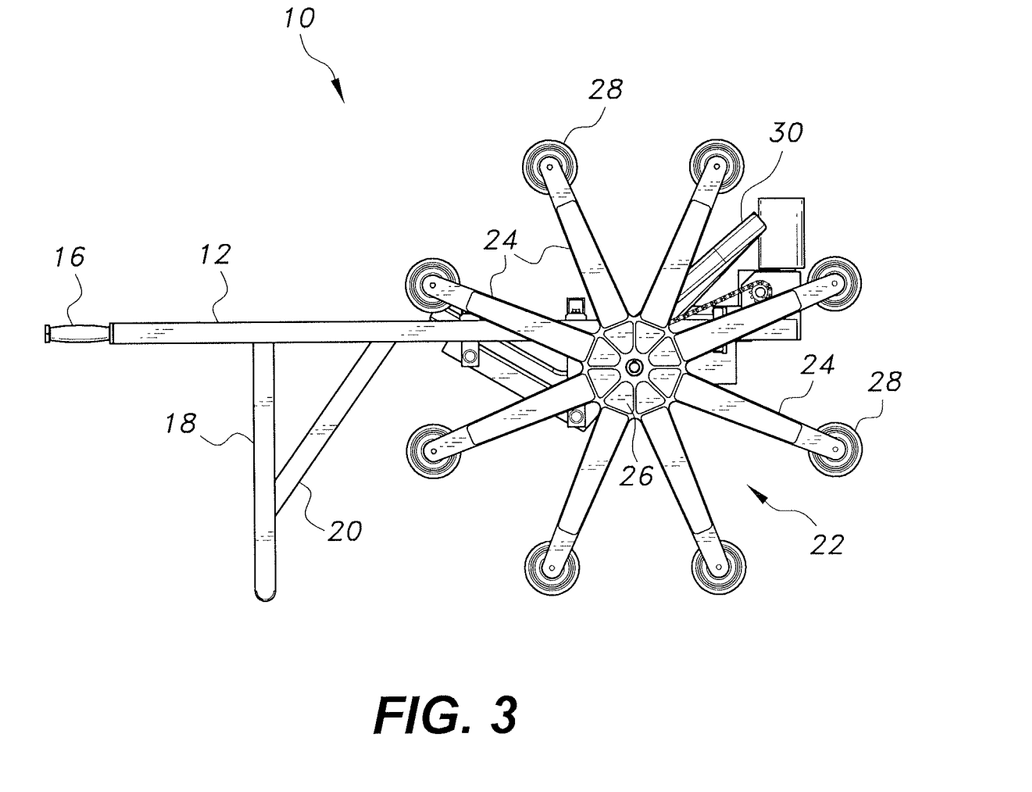
FIG. 3 is a side view of the stair-climbing wheeled carrier of FIG. 1.

Referring to FIGS. 1-3, the stair-climbing wheeled carrier 10 has a U-shaped frame defined by two elongated parallel handles 12 and a crossbeam 14 extending across the ends of the handles 12. The handles 12 may have handgrips 16 extending from the handles 12 at the ends opposite the crossbeam 14. The handles 12 and crossbeam 14 may be box beams made from a lightweight material, such as aluminum, or square or rectangular aluminum tubes. The frame may optionally include support legs 18 adjacent the handgrip ends of the handles 12. The support legs 18 may or may not be reinforced by diagonal braces 20 for greater stability.

The stair-climbing wheeled carrier 10 has star wheels 22 or spider wheels disposed on opposite sides of the frame. Star wheels typically have five spokes 24 extending from a central hub 26, but no peripheral rim. Each spoke 24 terminates in a small wheel 28 that is free rolling in a yoke. Spider wheels are similar, but may have fewer than five spokes or more than five spokes. The free rolling small wheels 28 permit the carrier 10 to be pushed across flat surfaces and against first and subsequent steps. The number of spokes 24 and angular separation between the spokes 24 may be selected to facilitate bearing the weight of the carrier 10 on one pair of the small wheels 28 while rotating the next spoke 24 through an arc permitting the weight of the carrier 10 to be borne on the small wheels 28 of the next spoke 24 on the next highest step of a staircase.

Figure 8:
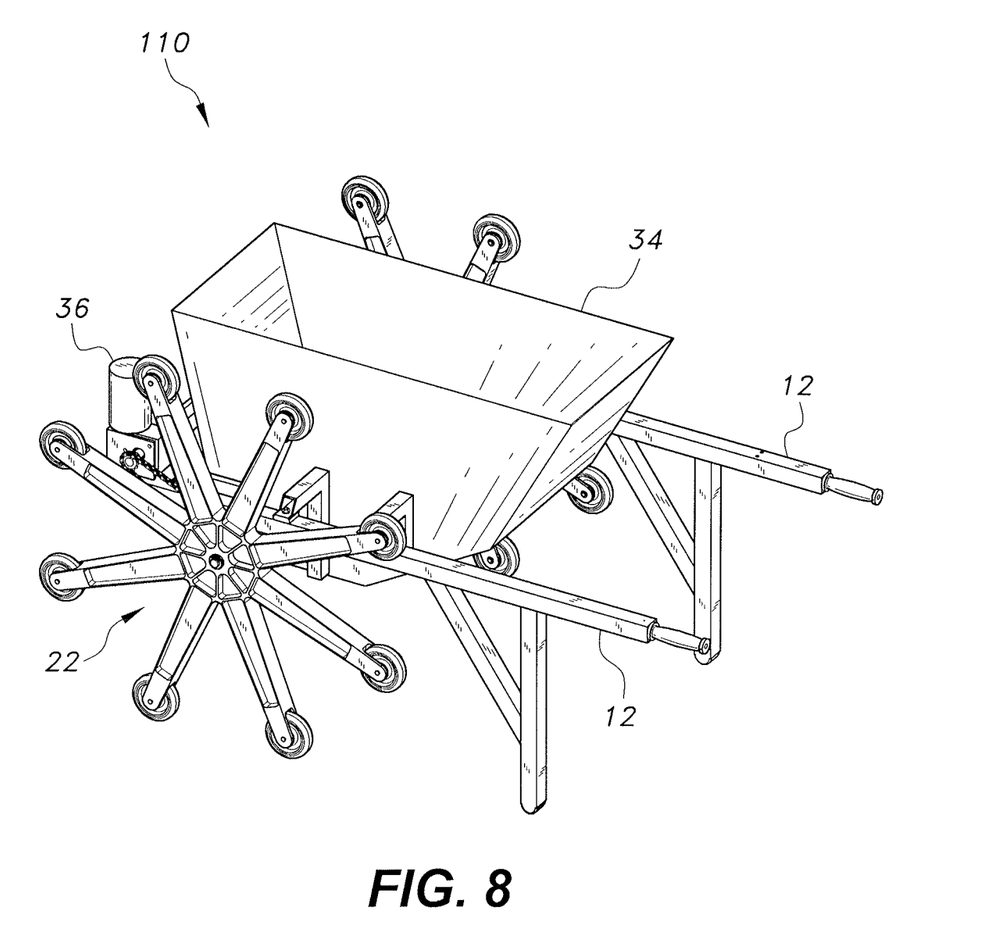
FIG. 8 is a perspective view of an embodiment of a stair-climbing wheeled carrier having a basket for transport of packages or other goods up a staircase.

A payload, in this case, a seat 30 for supporting a person P with impaired mobility making it difficult to climb stairs without assistance, may be supported on the carrier 10 by suitable brackets 32 attached to the handles 12. The seat 30 may be configured so that the person being transported faces the handgrip end of the handles 12. An assistant A grasps the handles 12 to support the frame as the carrier 10 advances upstairs, as shown in FIG. 1. The support legs 18 permit the assistant A to release the handles 12 when the carrier 10 is on a flat, level surface without tipping over the carrier 10. The payload is shown as a basket 34 or barrow in FIG. 8 for carrying groceries or other goods upstairs using the carrier 110. Although a seat 30 and a basket 34 are shown in the drawings for purposes of illustrating the stair-climbing wheeled carrier, it should be understood that any payload may be secured to the carrier using appropriate brackets, including a wheelchair, a platform for supporting a person while standing (e.g., a person using a walker), etc.

Figure 4:
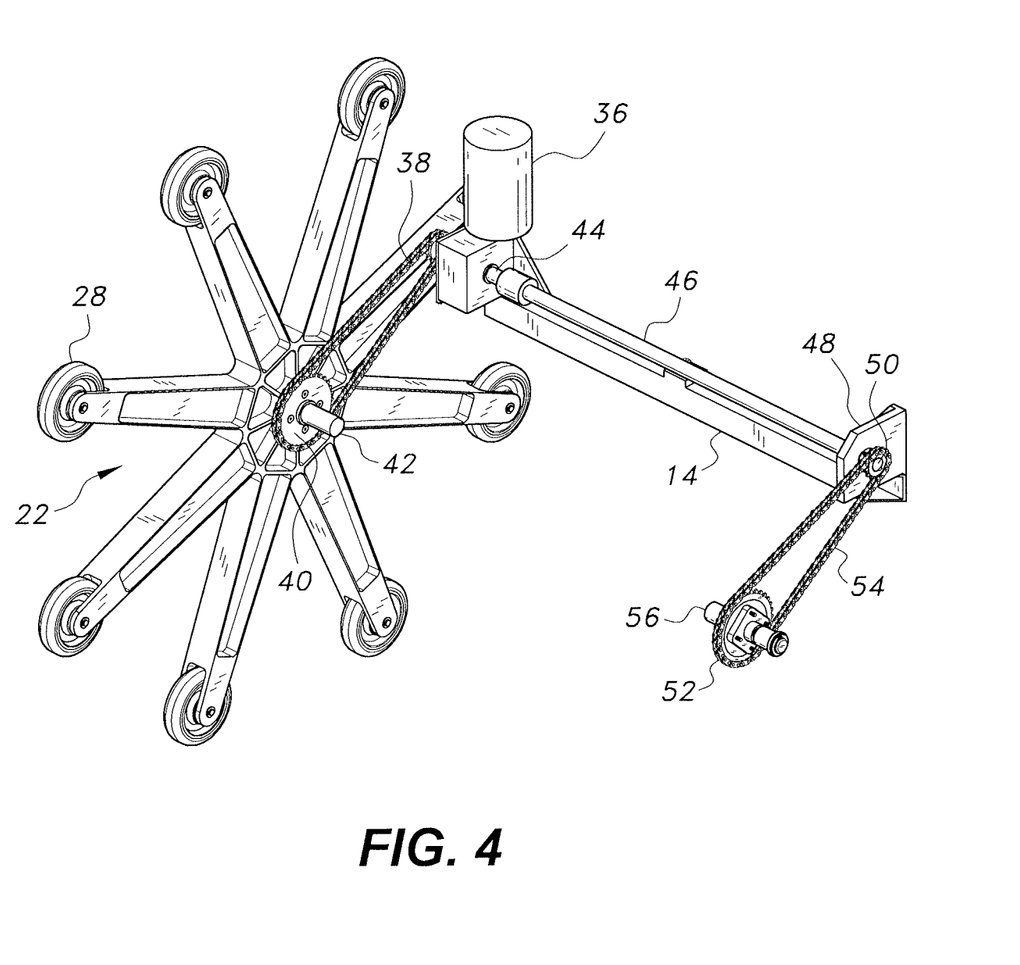
FIG. 4 is a partial perspective view of the motor and drive mechanism of the stair-climbing wheeled carrier of FIG. 1, shown with the frame and other parts omitted.

Referring to FIG. 4, a dual shaft worm gear motor 36 is mounted on the crossbeam 14. One shaft has a drive sprocket (behind the gear box) for a chain drive mounted thereon, the chain 38 driving a driven sprocket 40 mounted on the axle 42 of one of the star wheels 22. The other shaft 44 of the dual shaft worm gear motor 36 is coupled to a drive shaft 46 extending to the opposite side of the frame and is journaled through a bearing mounted in a bracket 48 attached to the opposing handle. A second drive sprocket 50 is mounted on the end of the drive shaft 46, and drives a second driven sprocket 52 through second chain 54. The second driven sprocket 52 is mounted on the axle 56 of the opposing star wheel 22 (omitted from FIG. 4 to show details of the drive mechanism). Thus, the opposing star wheels 22 are synchronously driven by an electric motor 36, which is reversible to move the carrier 10 forward and backward. The worm gear motor 36 and chain drives may be selected to provide sufficient gear reduction to allow a high speed electric motor to produce the torque necessary for the star wheels 22 to climb the staircase while supporting the payload.

Figure 5:
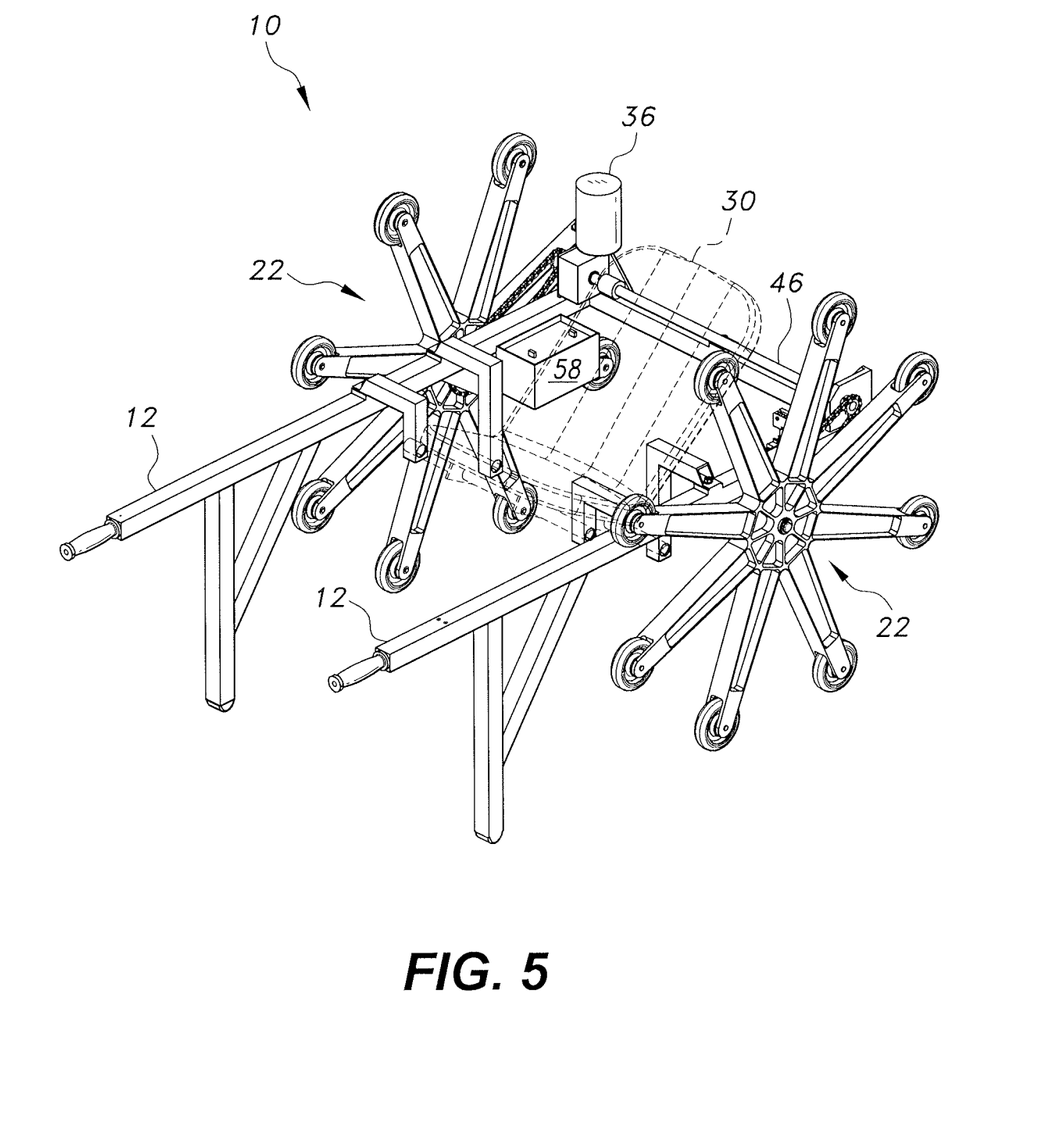
FIG. 5 is a perspective view of the stair-climbing wheeled carrier of FIG. 1, the seat being shown in phantom to show the battery.

As shown in FIG. 5, the dual shaft worm gear motor may be powered by a battery 58 mounted on the frame behind the seat 30. The battery 58 may be a scooter battery of the type used to power an electric scooter.

Figure 6:
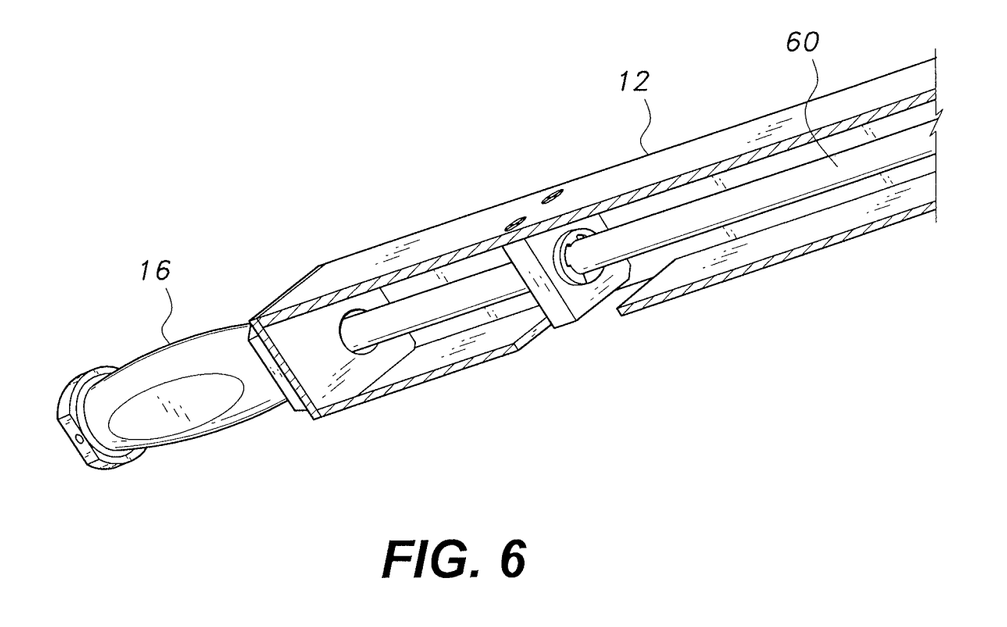
FIG. 6 is a partial perspective view in section showing a portion of the throttle assembly disposed in one of the handles of the stair-climbing wheeled carrier of FIG. 1.
Figure 7:
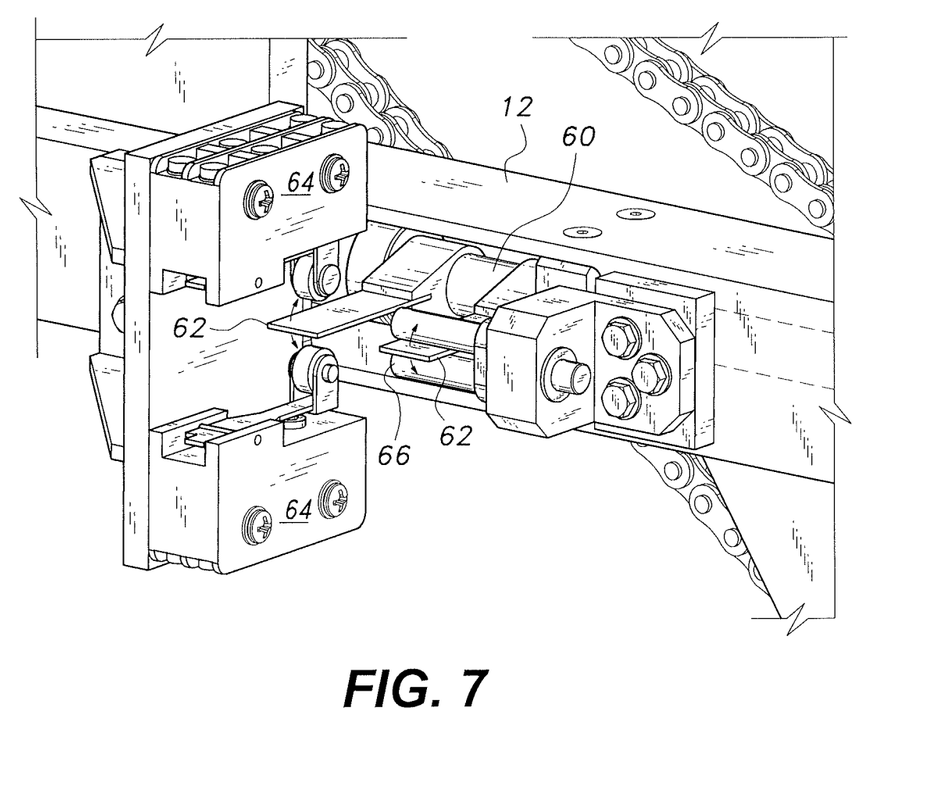
FIG. 7 is a partial perspective view of the stair-climbing wheeled carrier of FIG. 1, showing a portion of the leaf spring and switch assembly mounted in the frame.

Referring to FIGS. 6 and 7, the carrier may have a throttle that operates like the throttle of an electric bike. A throttle rod 60 may extend through one of the hollow, box beam handle 12 and be operated by rotation of the grip 16 by the assistant A. Leaf springs 62 attached to the throttle rod 60 may contact limit switches 64 or slide switches 66 so that the throttle may be used to activate or deactivate the motor 36, or to place the device in neutral when the throttle is released.

It is to be understood that the stair-climbing wheeled carrier is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A stair-climbing wheeled carrier, comprising:
   a U-shaped frame having a pair of elongated parallel spaced apart handles, each of the handles having a first end and a second end, the frame further having a crossbeam extending between the second ends of the handles;
   a pair of multi-spoked wheels, each of the handles having a corresponding one of the multi-spoked wheels rotatably mounted thereon, each of the multi-spoked wheels having:
   a central hub;
   a plurality of radially spaced spokes extending from the central hub, each of the spokes having a free end opposite the central hub; and
   a freely rotatable ground-engaging wheel mounted on the free end of the spoke;
   at least one bracket extending from each of the handles;
   a payload support mounted on each of the at least one brackets between the handles;
   a prime mover operatively coupled to each of the multi-spoked wheels to power synchronous rotation of the multi-spoked wheels;
   wherein the prime mover applies power and torque to rotate the multi-spoked wheels for climbing stairs, the elongated spaced apart handles being adapted for being gripped by an assistant to support the frame while the carrier climbs the stairs; and
   wherein each central hub rotates independently; synchronization of the rotation of each central hub is provided by the prime mover, and wherein each central hub defines a space between the respective central hubs and the space does not contain a connecting axle connecting the central hubs.

2. The stair-climbing wheeled carrier according to claim 1, wherein the payload support comprises a seat adapted for supporting a person having impaired ability for climbing stairs.

3. The stair-climbing wheeled carrier according to claim 1, wherein the payload support comprises a basket adapted for holding goods for transport upstairs.

4. The stair-climbing wheeled carrier according to claim 1, wherein the payload support comprises a wheelchair support adapted to supporting a person in a wheelchair.

5. The stair-climbing wheeled carrier according to claim 1, wherein the payload support comprises a platform for supporting a standing person having impaired mobility.

6. The stair-climbing wheeled carrier according to claim 1, wherein each of the handles comprises a handgrip extending from the first end thereof.

7. The stair-climbing wheeled carrier according to claim 1, wherein each of the handles comprises a box beam.

8. The stair-climbing wheeled carrier according to claim 1, wherein each of the handles comprises a four-sided hollow tube.

9. The stair-climbing wheeled carrier according to claim 1, wherein each of said multi-spoked wheels comprises a star wheel.

10. The stair-climbing wheeled carrier according to claim 1, wherein each of said multi-spoked wheels comprises a spider wheel.

11. The stair-climbing wheeled carrier according to claim 1, wherein said prime mover comprises an electric motor.

12. The stair-climbing wheeled carrier according to claim 1, wherein said prime mover comprises an electric motor, the electric motor being reversible.

13. The stair-climbing wheeled carrier according to claim 1, further comprising a throttle connected to said prime mover.

14. The stair-climbing wheeled carrier according to claim 1, wherein said prime mover comprises a dual shaft worm gear motor having first and second shafts.

15. The stair-climbing wheeled carrier according to claim 14, further comprising:

a first chain drive gear system coupling the first shaft of said dual shaft worm gear motor to one of said multi-spoked wheels;

a drive shaft coupled to the second shaft of said dual shaft worm gear motor; and a second chain drive gear system coupling the drive shaft of to the other one of said multi-spoked wheels.

16. A stair-climbing wheeled carrier, comprising:

a U-shaped frame having a pair of elongated parallel spaced apart handles, each of the handles having a first end and a second end, the frame further having a crossbeam extending between the second ends of the handles;

a pair of multi-spoked wheels, each of the handles having a corresponding one of the multi-spoked wheels rotatably mounted thereon, each of the multi-spoked wheels having:

a central hub;

a plurality of radially spaced spokes extending from the central hub, each of the spokes having a free end opposite the central hub; and a freely rotatable ground-engaging wheel mounted on the free end of the spoke;

at least one bracket extending from each of the handles;

a payload support mounted on each of the at least one brackets between the handles;

a prime mover operatively coupled to each of the multi-spoked wheels to power synchronous rotation of the multi-spoked wheels;

wherein the prime mover applies power and torque to rotate the multi-spoked wheels for climbing stairs, the elongated spaced apart handles being adapted for being gripped by an assistance to support the frame while the carrier climbs the stairs;

wherein said prime mover comprises a dual shaft worm gear motor having first and second shafts.

17. The stair-climbing wheeled carrier according to claim 16, further comprising:

a first chain drive gear system coupling the first shaft of said dual shaft worm gear motor to one of said multi-spoked wheels;

a drive shaft coupled to the second shaft of said dual shaft worm gear motor; and a second chain drive gear system coupling the drive shaft of to the other one of said multi-spoked wheels.

18. The stair-climbing wheeled carrier according to claim 16, wherein the payload support comprises a seat adapted for supporting a person having impaired ability for climbing stairs.

19. The stair-climbing wheeled carrier according to claim 16, wherein the payload support comprises a wheelchair support adapted to supporting a person in a wheelchair.

20. The stair-climbing wheeled carrier according to claim 16, wherein the payload support comprises a basket adapted for holding goods for transport upstairs.

* * * * *